United States Patent [19]

Briffod

[11] Patent Number: 5,196,665
[45] Date of Patent: Mar. 23, 1993

[54] MULTI-LAYER ELECTRODE WIRE AND METHOD FOR PRODUCING THE SAME

[75] Inventor: Jean-Paul Briffod, Les Carelines chez Uegradaz, France

[73] Assignee: Charmilles Technologies SA, Meyrin, Switzerland

[21] Appl. No.: 574,655

[22] Filed: Aug. 29, 1990

[30] Foreign Application Priority Data

Aug. 30, 1989 [CH] Switzerland ............... 03140/89

[51] Int. Cl.$^5$ .................... B23H 7/08; B23H 7/24
[52] U.S. Cl. ............................................. 219/69.12
[58] Field of Search ............... 219/69.12, 69.17; 428/615, 635, 656, 658, 674; 148/13.1, 13.2; 204/224 M

[56] References Cited

U.S. PATENT DOCUMENTS

| | | | |
|---|---|---|---|
| 4,287,404 | 9/1981 | Convers et al. | 219/69.12 |
| 4,341,939 | 7/1982 | Brifford et al. | 219/69.12 |
| 4,686,153 | 8/1987 | Tominaga et al. | 219/69.12 |
| 4,935,594 | 6/1990 | Groos et al. | 219/69.12 |
| 4,968,867 | 11/1990 | Banzai et al. | 219/69.12 |
| 4,977,303 | 12/1990 | Brifford | 219/69.12 |

FOREIGN PATENT DOCUMENTS

| | | | |
|---|---|---|---|
| 59-14429 | 1/1984 | Japan . | |
| 60-104616 | 6/1985 | Japan . | |
| 61-76215 | 4/1986 | Japan . | |
| 117021 | 6/1986 | Japan | 219/69.12 |
| 218026 | 9/1987 | Japan | 219/69.12 |
| 246425 | 10/1987 | Japan | 219/69.17 |
| 64-78725 | 3/1989 | Japan | 219/69.12 |
| 526365 | 9/1972 | Switzerland . | |
| 646083 | 11/1984 | Switzerland . | |

Primary Examiner—Geoffrey S. Evans
Attorney, Agent, or Firm—Gifford, Groh, Sprinkle, Patmore and Anderson

[57] ABSTRACT

A wire electrode for electro-erosion cutting consisting of a core of electrically conductive material. The core is covered with a film of multiple fine layers. The layers provide the characteristics of high electrical conductivity and low melting and vaporization temperatures in an alternating fashion. The alternating layers of the wire electrode may be diffused into one another in order to provide alloys of desired structure and composition. A method for producing the multi-layer electrode wire is also disclosed.

14 Claims, No Drawings

MULTI-LAYER ELECTRODE WIRE AND METHOD FOR PRODUCING THE SAME

The invention concerns the composition and manufacture of a wire electrode for EDM cutting, with a core of good electrical conductivity, and with good mechanical, thermal and electrical properties, especially good breaking strength and good conductivity, this core being covered with a film containing a metal of low melting and vaporization point, acting as a heat shield.

EDM cutting is carried out with a wire electrode moving continuously by means of a drive system of known type from a feeder unit to a reclaimer unit. Along the path of the wire there are normally two guides either side of the electrically conductive part to be machined, and these run the wire through the part, positioning it with precision relative to the latter. The space between these two guides will be referred to as the "machining zone". The electro-erosion machine also has a current supply which passes a succession of electrical impulses between the electrode wire and the part, along this machining zone, in order to remove material from the part by electro-erosion. This zone is scoured with a machining liquid, such as water or an aqueous solution. As material is removed, the part is moved in a plane perpendicular or oblique relative to the centerline of the wire electrode, following a predetermined path, this relative movement being numerically controlled to effect predetermined cutting in the part.

It is known that the output and machining speed achieved in EDM cutting with a wire electrode, depend on the current density conducted by this wire, and on its breaking strength when subjected simultaneously to tension and temperature rise. In fact, precise cutting can only be achieved if the wire is properly tensioned between the two guides positioned either side of the part to be machined. It is, in fact, sufficient to mark the position of these guides to accurately determine the position of the edges of the slot cut by the wire. Also, by increasing the tension of the wire, its vibration is reduced, as are defects in the corners, these primarily being due to deflection of the wire. The wire must thus resist a relatively high tension (generally between 1 and 4 kilos), at the same time as a temperature rise due to sparks and the Joule effect. As metals with good electrical conductivity generally have low mechanical resistance, this explains the difficulty of manufacturing wire electrodes suitable for machining at high speed.

A great many efforts have been made to obtain an improved wire:

the device described in patent CH 526.365 enables the wire to be cold drawn before passing through the machining zone, which ensures the wire is straight and increases its mechanical strength. The copper used at the beginning has been replaced by brass; other alloys with higher mechanical tensile strength have then been tried;

a composite wire has also been tried, consisting for example of a steel core with a metal covering with good conductivity, such as copper, as described in patent CH 620.621;

patents CH 620.621 and CH 620.622 propose a way in which to protect the wire core with a deposit of metal of low melting and vaporization point acting as a heat shield. This deposit can in turn be covered by a semi-conductive film, consisting, for example, of a metal oxide with low vaporization point, to eliminate short-circuits, as proposed in patent CH 633.739;

this deposit can be achieved by superimposing several layers. Thus, again as described in this patent CH 633.739, four layers of zinc of thickness 2 microns, for example, are superimposed on a core of copper, copper or molybdenum alloy, or of copper-clad or copper-alloy clad steel, and these are annealed in succession in an oxidizing atmosphere to form a zinc oxide film on the surface. These annealing processes cause diffusion of the Cu and Zn atoms, such that pure zinc disappears leaving a Cu/Zn alloy. This provides alternate zinc alloy and zinc oxide films;

to increase the machining speed, patent EP 173 786 recommends work-hardening the wire after oxidizing annealing to improve its properties;

similarly, Japanese applications published under numbers 60-104.616 and 61-76.215 propose alternating layers of zinc and copper, and then either hot-extruding these at a sufficient high temperature with a surface reduction of at least 85% to ensure adequate diffusion, or extruding and then annealing them in several stages to achieve this diffusion.

The present invention is designed to improve the mechanical strength of known wire electrodes, while maintaining their advantages, such as the heat shield effect, the elimination of short-circuits and good absorptivity, as described in patents CH 620.622 and CH 633.739.

It is well known that the structure and hence the properties of known wire electrodes vary according to the heat treatments to which they are subjected during manufacture. In the case of adjacent layers of copper and zinc, for example, copper atoms dissolve into the zinc by fusion, or there is inter-diffusion, whereby the atoms of each of these metals diffuse into the adjacent layer. This phenomenon has been clearly described in patents CH 633.739 and CH 646.083. In the case of inter-diffusion, the diffusing metal content changes with the distance from the core of the wire to its surface. For example, in the case of laminated wire made from a layer of zinc deposited on a layer of copper or brass, strata of different crystalline structure are obtained, corresponding to the different phases of the brass. Alloys become increasingly enriched in zinc from the core to the surface. This gives a succession of layers of variable properties along the wire radius, as each phase of the brass has different properties. Patent CH 646.083 had already pointed out the possibility of using inter-diffusion between different layers deposited in a given order, in order to adapt the concentration profile to the properties required at each depth: zinc enriched at the surface, and nickel enriched deeper down.

However, these phenomena are difficult to control, as the crystalline structure and the mechanical properties of the alloy obtained depend in particular on the temperature at which diffusion occurs and the percentage of copper and zinc present. It is thus difficult to foresee what the properties of the wire obtained will be. In the example above of a wire consisting of layers of cooper and zinc, brass $\gamma$ (approximately 60–70% zinc) is an extremely fragile phase, with an attendant risk of rupture if the layer exceeds a few microns, whereas phases $\beta$ and especially $\alpha$ have satisfactory mechanical properties. Even if control were possible, it would be difficult to achieve a suitable compromise, as phases $\alpha$ and $\beta$ contain little zinc and thus have a less marked heat shield effect than phase γ.

By trying to avoid phase γ and achieve the highest possible proportion of brass β in order to improve breaking strength, one of the aims sought cannot be achieved: to have a high zinc content on the surface to maintain the heat shield effect and avoid further deposition of copper, as brass β corresponds to a copper concentration of 70 to 40 %. Thus it is not possible to have a wire with a high zinc content at the surface and high rupture strength.

However, with the present invention, copper and zinc are deposited alternately in multiple fine layers, i.e. of the order of 0.1 to 1 micron. The different phases of the brass obtained after heat treatment then occur in multiple fine layers (of the order of 0.1 to 0.5 or 1 micron). The layers of brass γ thus no longer have the above disadvantage, as they are fairly flexible offering satisfactory mechanical strength and breaking strength. However, they still have the advantage of being rich in zinc and having high electro-erosion wear resistance. There is thus no need to avoid this γ phase, and nor is this advisable.

These multiple fine layers also mean that the diffusion time can be reduced. This therefore affords better control, especially in selecting the appropriate thicknesses for zinc and copper layers. In particular, it means that heat treatments can be left out within the manufacture of the wire electrode, as diffusion can be carried out directly on the EDM machine, during use of wire electrode.

Multiple fine layers of metal are deposited on a conductive core with good mechanical properties, by any known method, alternating a metal with good conductivity with a metal whose melting and vaporization temperatures are lower than that of the highly conductive metal or an alloy of this metal; inter-diffusion of these two metals is possible. The wire thus obtained is then work-hardened to achieve the final diameter required. Diffusion is carried out directly on the electro-erosion machine, for example during the annealing step to which the wire electrode is subject before it is passed through the machine, or when it is heated on entering the machining zone.

Unlike state of the art wires, wire electrodes according to this invention have several fine layers of a highly conductive metal, separated by other fine layers containing a metal with low melting and vaporization point, whereas the layers on known wire electrodes consist of an alloy of these two metals, as a result of reciprocal diffusion of each of these metals into the adjacent layers.

This is why the wire electrodes as per this invention can be zinc enriched at the surface to offer an efficient heat shield, whilst maintaining a low zinc content in the inner layers, so that they can better resist rupture and conduct electricity and heat. This achieves a better compromise between the electrical, thermal and mechanical properties required by high-speed EDM cutting, than is possible with known wire electrodes.

According to one of the possible constructions, the wires in this invention can have a zinc concentration which increases and decreases several times from the core of the wire to the surface.

The invention as described above concerns a preferred form of construction, based on successive alternate layers of copper and zinc. It may, however, be advantageous to use other metals, or alloys, or metal compounds.

Hence, metals with low vaporization point other than zinc can act as a heat shield: cadmium, lead, antimony, bismuth and alloys of these. However, the results obtained with a zinc deposit are very satisfactory as the fact that this metal erodes easily is no longer a disadvantage, as other zinc enriched layers are exposed in succession as the surface of the wire is eroded away and these layers near to the surface can consist of a brass offering relatively good erosion resistance (brass γ or β).

With regard to the electrically conductive layers, copper can be used, or an alloy of copper or copper with a given concentration of copper oxide or another metal or alloy or compound containing a metal other than copper which diffuses into the adjacent layers containing metal with a low vaporization point, provided that the latter also diffuses into the conductive layers.

The thickness and composition of the successive layers from the core to the surface can also be varied.

The core of the wire can be made entirely of metal, an alloy or metal compound, crystalline or non-crystalline, especially those with good tensile strength and good current density absorption. Examples are copper, brass, steel, possibly with a copper coating, tungsten, and molybdenum, but the possible materials are in no way limited to this list. Several layers of different metals or alloys can be produced.

According to one of the preferred variants, the wire is coated with a semi-conductive film, such as zinc oxide. As described in patent CH 633.739, this means that short-circuits can be virtually eliminated.

Other metal oxides, such as those quoted in the patent mentioned above, can be used ($CuO_2$, $Cu_2O$, $MgO$, $PbO$, $MnO_2$, $CdO$, $In_2O_3$, $TiO_2$ and $NiO$), or insulators which become conductive in thin layers beyond a certain potential difference, such as $Al_2O_3$. Non-metallic materials such as carbides, borides, silicides, sulphides and nitrides of different metals can also be used.

As described in patent CH 633.739, the heat treatment(s) undergone by the wires according to the present invention as they pass through the EDM machine also produce a porous structure at the surface, which means good absorptivity, thus promoting cooling by the machining liquid. This property also enables the machining speed to be increased.

According to certain variants, the wire can be coated with a film to assist the sliding of the wire through the machining zone and wire guides, or an anti-corrosion film. The latter is, however, unnecessary when the wire already has an oxide film, as this also provides protection against corrosion.

As the film coating the wire core consists of superimposed multiple fine layers, with one in two of highly conductive metal (such as copper), the wires as per this invention offer a further advantage: a highly conductive layer is situated very near to the surface of the wire, unlike known wires where there is a thickness of several microns before reaching a highly conductive layer or where said conductive layers have been transformed by diffusion into zinc alloy. Also, it is only separated by a very thin layer from the lower conductive layer, etc. This improves the machining current supply. Also, heat is transferred much more easily through this wire than in known wires, as it has better thermal conductivity, and the temperature rise by Joule effect will be reduced;

the wire cools more quickly, and can take a higher current density, which means that the machining speed can be increased. By reducing the various causes of local temperature rise, the wires thus have a lower risk of rupture than known wires.

A further advantage of this invention lies in the method of manufacture of new wire electrodes; heat treatment is no longer necessary, the heat released by the EDM machining sparks or that used to anneal the wire before passing it through the machining zone is sufficient to cause diffusion, whereas it was normally the case that with laminated wires, heat treatment had to be carried out after application of each layer. Hence, in the case of wires with several alternating layers of zinc and zinc oxide, as described in CH 633.739, annealing is carried out after application of each zinc layer. Similarly, the Japanese patent application published under number 61-76.215 recommends several hot-extruding and annealing operations.

The production rate of wire electrodes is thus increased with this invention, as the wire passes through the coating and cold-forming or cold drawing stations at speed; there is no longer any temperature rise, annealing or cooling step. The savings in time, space and installation and energy costs are obvious.

I claim:

1. A wire electrode for electro-erosion cutting, comprising:
    a core of electrically conductive material with good mechanical properties;
    a film of multiple fine layers covering said core; and
    said multiple fine layers having alternately a first metal with high electrical conductivity and a second metal whose vaporization and melting temperatures are lower than that of said first metal.

2. The wire electrode according to claim 1, in which said second metal with low melting and vaporization point and said first metal with good conductivity can diffuse into each other, to provide alloys of given structure and composition.

3. The wire electrode according to claim 1, in which said core is made of an alloy of said first metal with good conductivity and said second metal with low melting and vaporization point.

4. The wire electrode according to claim in which said film consists of alternate superimposed said layers of copper and zinc.

5. The wire electrode according to claim 1, wherein said conductive material of said core is a metal selected from the group consisting of copper, brass, steel or copper-clad steel and said core is covered with superimposed alternate layers of copper and a metal selected from the group of consisting zinc and zinc alloys.

6. The wire electrode according to claim 5 in which an outer layer of said multiple fine layers is zinc.

7. The wire electrode according to claim 1, in which an outer layer of said multiple fine layers consists of a semi-conductor.

8. The wire electrode according to claim 7, in which an outer layer of said multiple fine layers is zinc oxide.

9. A wire electrode for electro-erosion cutting, comprising:
    a core of electrically conductive material with good mechanical properties;
    a film of multiple fine layers covering said core; and
    said multiple fine layers having alternately a first metal with high electrical conductivity and a second metal whose vaporization and melting temperatures are lower than that of said first metal, said alternating layers of said first metal and said second metal are capable of diffusing together to form alloys of given structure and composition, at least two said alloys of different crystalline structure being present in at least one of said layers.

10. A method for manufacturing a multilayer electrode wire comprising the steps of:
    superimposing a plurality of alternate fine layers of a first metal with high electrical conductivity and a second metal with a low melting and vaporization point onto a core made of electrically conductive material;
    finishing said superimposed alternate fine layers with a said layer of said second metal; and
    cold drawing said superimposed fine layers and said finishing layer to cold-form said electrode wire without causing any of said metals to diffuse into an adjacent said layer.

11. The method of claim 10 further comprising the step of heat treating said electrode wire before or during electrical discharge machining to obtain a plurality of layers of alloys of said metal with a low melting point and vaporization point with a said metal with high electrical conductivity.

12. The method of claim 11, wherein said step of heat treating said electrode wire produces a film consisting of appropriate alternate layers of copper and a metal selected from the group consisting of zinc and zinc alloys, said electrode wire penetrating the slot to be machined has superimposed layers of brass and brass alloys, the latter containing 30 to 60 percent zinc content.

13. The method of claim 11 wherein said step of heat treating said electrode wire produces a film consisting of appropriate alternate layers of copper and a metal selected from the group consisting of zinc and zinc alloys, said electrode wire penetrating the slot to be machined has superimposed layers of brass of thickness less than 0.5 microns and a zinc content over 60%.

14. The method of claim 11, wherein said step of heat treating said electrode wire produces a film consisting of appropriate alternate layers of copper and a metal selected from the group consisting of zinc and zinc alloys, said electrode wire penetrating the slot to be machined has layers of brass with greater than 60% zinc content alternating with layers of brass with zinc content between 30 and 60% and with a thickness greater than 8 microns.

* * * * *

UNITED STATES PATENT AND TRADEMARK OFFICE
CERTIFICATE OF CORRECTION

PATENT NO. :   5,196,665
DATED      :   March 23, 1993
INVENTOR(S):   JEAN-PAUL BRIFFOD It is certified that error appears in the above-identified patent and that said Letters Patent is hereby corrected as shown below:

Column 5, line 46, after "claim", insert --1--.

Column 6, line 41, after "brass" (second occurrence), insert --$\beta$--.

Column 6, line 49, after "brass", insert --$\gamma$--.

Signed and Sealed this

Thirty-first Day of May, 1994

Attest:

BRUCE LEHMAN

*Attesting Officer*     *Commissioner of Patents and Trademarks*